2,821,552
OXIDATION OF HYDROCARBONS WITH SULFUR DIOXIDES

Thomas H. Strickland and Alan Bell, Kingsport, Tenn., assignors to Eastman Kodak Company, Rochester, N. Y., a corporation of New Jersey No Drawing. Application June 12, 1956
Serial No. 590,809

8 Claims. (Cl. 260—524)

This invention relates to a novel process for the oxidation of alkylated benzene hydrocarbons. In a specific aspect this invention relates to a process for the oxidation of monoalkylated and dialkylated benzene hydrocarbons in the vapor phase with sulfur dioxide to form aromatic acids. In a more specific aspect, this invention relates to the oxidation of toluene with sulfur dioxide in the vapor phase to form benzoic acid.

In the prior art, alkylated aromatic hydrocarbons have been oxidized with a variety of oxidizing media, for example, steam, oxygen, which may be in the form of air, and the like. In some instances, sulfur dioxide has been employed along with the oxygen or other oxidizing medium in order to control the reaction. However, the prior art procedures have not recognized the fact that sulfur dioxide itself can be used as the oxidizing medium for alkylated aromatic hydrocarbons.

In accordance with this invention, it has been found that sulfur dioxide can be used as the sole source of oxygen for the oxidation of alkylated benzene hydrocarbons. The reaction is conducted in the vapor phase at atmospheric pressure and, in most instances, an acid, which is dependent upon the hydrocarbon feed, is the predominant or sole product of the reaction.

The alkylated benzene hydrocarbons that are oxidized in accordance with this invention are benzene derivatives containing one or two lower alkyl groups or substituents. When the benzene nucleus contains a single lower alkyl radical such as methyl, ethyl, propyl, isopropyl, butyl and the like, the resulting product is either predominantly or solely benzoic acid. When the benzene nucleus contains more than a single alkyl substituent, such as a xylene, the resulting product is usually a mixture of the corresponding toluic acid and phthalic acid.

In practicing this invention, sulfur dioxide is the sole source of oxygen for the oxidation reaction. If desired, inert gases, such as nitrogen, carbon dioxide and the like, can be employed to control the reaction; however, these inert gases are not essential to the carrying out of the reaction.

The process of this invention is usually carried out by passing a mixture of sulfur dioxide vapor and hydrocarbon vapor at atmospheric pressure over a heated catalyst for the reaction. Among the catalysts that can be used for the reaction are oxides of heavy metals in group VA, VIA and VIII of the periodic table. For example, oxides of metals, such as vanadium, molybdenum, tungsten, chromium, iron and nickel can be used as catalysts for the reaction. The oxides of vanadium and tungsten are the preferable catalysts for this reaction. If desired, these catalysts can be supported on a suitable supporting material such as alumina, silica and the like.

As indicated above, the reaction is ordinarily carried out at atmospheric pressure and an elevated temperature. The temperature for the reaction can vary within rather wide limits. A suitable reaction temperature is within the range of 350 to 450° C., with a contact time between reactants and catalyst of 3 to 5 seconds. It will be understood, of course, that by increasing or decreasing the contact time, the temperature can also be varied. For example, at shorter contact times, higher temperatures than 450° C. can be used and at contact times greater than 5 seconds, reaction temperatures lower than 350° C. can be employed. Superatmospheric pressures are undesirable since the reactants are in the gaseous phase. Subatmospheric pressures can be used, but atmospheric pressure is preferred for the process.

It is believed that the reaction takes place in accordance with the following illustrative equation:

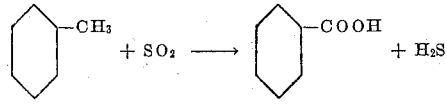

It is, of course, to be realized that in this equation, toluene is merely representative of the hydrocarbons that can be oxidized in accordance with this process. It is evident from this equation that the hydrocarbon and sulfur dioxide are employed in the reaction on an equimolecular basis. If desired, an excess of either the hydrocarbon or the sulfur dioxide can be employed to carry out the reaction. When an excess of hydrocarbon or sulfur dioxide is used, the excess gas forms a diluent for the reaction in the same manner in which nitrogen or other inert gas can be used to control the reaction.

In oxidation procedures, wherein a hydrocarbon is oxidized in the vapor phase with air or oxygen, the resulting oxidation products are mixed oxygen-containing compounds. However, when the same hydrocarbon is oxidized in the vapor phase with gaseous sulfur dioxide, under the conditions herein set forth, the resulting oxidation product is usually only one oxygen-containing compound. For example, if toluene is oxidized with air over vanadium oxide as a catalyst, the product of the reaction is a mixture of benzaldehyde, benzoic acid and maleic acid. However, when toluene is oxidized with gaseous sulfur dioxide under the conditions herein set forth, using a vanadium oxide catalyst, the product is primarily benzoic acid. In the process of this reaction, the presence of maleic acid has not been detected in the reaction product although traces of benzaldehyde may be present.

The following examples are illustrative of this invention:

Example 1

Toluene, nitration grade, was passed at a rate of 0.176 moles per hour simultaneously with gaseous sulfur dioxide at a rate of 0.0369 mole per hour into a reactor containing 30 g. of vanadium oxide ($V_2O_5$) catalyst previously heated to 350° C. The reaction zone was maintained at a temperature of about 350° C. to 365° C. The reaction proceeded 65 minutes and the reaction products were extracted with a solution of sodium bicarbonate. The sodium bicarbonate extract was subsequently acidified and 4.0 g. of crude benzoic acid were separated, representing an 82% yield based on the sulfur dioxide used.

Example 2

Toluene, nitration grade, was passed at a rate of 0.183 mole per hour simultaneously with gaseous sulfur dioxide at a rate of 0.0254 mole per hour into a reactor containing 30 grams of tungsten oxide catalyst previously heated to 350° C. The reaction zone was maintained at a temperature of about 350° C. to 365° C. The reaction proceeded for 40 minutes and the reaction products were extracted with a sodium bicarbonate solution. The sodium bicarbonate extract was subsequently acidified and 1.7 grams of crude benzoic acid were separated, representing an 82% yield based on the sulfur dioxide used.

Example 3

Toluene, nitration grade, was passed at a rate of 0.218 mole per hour simultaneously with gaseous sulfur dioxide at a rate of 0.516 mole per hour into a reactor containing 30 g. of vanadium oxide catalyst previously heated to 450° C. The reaction zone was maintained at a temperature of about 450° C. to 465° C. The reaction proceeded for 127 minutes and the reaction products were extracted with a sodium bicarbonate solution. The sodium bicarbonate extract was subsequently acidified and 6.0 grams of crude benzoic acid were separated, representing a 45% yield based on the sulfur dioxide used.

*Example 4*

Toluene, nitration grade, was passed at a rate of 0.176 mole per hour simultaneously with gaseous sulfur dioxide at a rate of 0.023 mole per hour into a reactor containing 30 grams of tungsten oxide catalyst perviously heated to 450° C. The reaction zone was maintained at a temperature of about 450° C. to 465° C. The reaction proceeded for 32 minutes and the reaction products were extracted with a sodium bicarbonate solution. The sodium bicarbonate extract was subsequently acidified and 0.5 gram of crude benzoic acid separated, representing a 33% yield based on the sulfur dioxide used.

*Example 5*

Toluene, purified grade, was passed at a rate of 0.1465 mole per hour simultaneously with gaseous sulfur dioxide at a rate of 0.0419 mole per hour and nitrogen gas at a rate of 0.0048 mole per hour into a reactor containing 30 g. of vanadium oxide catalyst previously heated to 410° C. The reaction proceeded for a period of 6 hours and the reaction products were extracted with a 10% solution of sodium hydroxide. The sodium hydroxide extract was subsequently acidified and 30.1 grams of crude benzoic acid were separated, representing a 97% yield based on the sulfur dioxide.

*Example 6* o-Xylene was passed at a rate of 0.092 mole per hour simultaneously with gaseous sulfur dioxide at a rate of 0.0307 mole per hour into a reactor containing 30 grams of vanadium oxide catalyst previously heated to 410° C. The afore-described conditions represent a calculated contact time of 3.0 seconds. The reaction was voluntarily terminated after 205 minutes, and the reaction products were extracted with a 10% solution of sodium hydroxide. The sodium hydroxide extract was subsequently acidified and the total o-phthalic acid and o-toluic acid collected. The o-toluic acid was separated from the o-phthalic acid by extraction of the o-toluic acid with chloroform. The yield of crude o-phthalic acid was 1.0 gram representing a 15.8% yield based on sulfur dioxide. The yield of crude o-toluic acid was 1.3 grams representing a 14.2% yield based on sulfur dioxide.

*Example 7*

Ethylbenzene was passed at a rate of 0.103 mole per hour simultaneously with gaseous sulfur dioxide at a rate of 0.068 mole per hour and nitrogen gas at a rate of 0.0048 mole per hour into a reactor containing 30 grams of vanadium oxide catalyst previously heated to 410° C. The afore-described conditions represent a calculated contact time of 3.0 seconds. The reaction was voluntarily terminated after 50 minutes, and the reaction products were extracted with a 10% solution of sodium hydroxide. The sodium hydroxide extract was subsequently acidified and the benzoic acid extracted with ether. The ether extract yielded 1.9 grams of crude benzoic acid representing a 52% yield based on sulfur dioxide. Benzaldehyde was determined in the reaction products after the sodium hydroxide extraction by standard analysis with 2,4-dinitrophenylhydrazine reagent. The yield of benzaldehyde was 0.36 gram representing a 12% yield based on sulfur dioxide.

*Example 8*

Isopropylbenzene was passed at a rate of 0.09 mole per hour simultaneously with gaseous sulfur dioxide at a rate of 0.06 mole per hour and nitrogen gas at a rate of 0.0048 mole per hour into a reactor containing 30 grams of vanadium oxide catalyst previously heated to 410° C. The afore-described conditions represent a calculated contact time of 3.5 seconds. The reaction was voluntarily terminated after 59 minutes and the reaction products extracted with a 10% solution of sodium hydroxide. The sodium hydroxide extract was subsequently acidified, and 1.0 gram of crude benzoic acid separated representing a 41% yield based on sulfur dioxide.

*Example 9* n-Butylbenzene was passed at a rate of 0.078 mole per hour simultaneously with gaseous sulfur dioxide at a rate of 0.062 mole per hour and nitrogen gas at a rate of 0.0048 mole per hour into a reactor containing 30 grams of vanadium oxide catalyst previously heated to 410° C. The afore-described conditions represent a calculated contact time of 4.0 seconds. The reaction was voluntarily terminated after 60 minutes and the reaction products extracted with a 10% solution of sodium hydroxide. The sodium hydroxide extract was subsequently acidified and 0.7 gram of crude benzoic acid was separated, representing a 37% yield based on sulfur dioxide.

We claim:

1. The process for oxidizing mono- and di-alkylated benzene hydrocarbons wherein the alkyl radicals contain 1 to 4 carbon atoms to form an aromatic acid which comprises contacting said hydrocarbon and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at an elevated temperature of at least 350° C.

2. The process for oxidizing a lower monoalkylated benzene hydrocarbon wherein the alkyl radical contains 1 to 4 carbon atoms to form benzoic acid which comprises contacting said hydrocarbon and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at an elevated temperature of at least 350° C.

3. The process according to claim 2 wherein the hydrocarbon is ethylbenzene.

4. The process according to claim 2 wherein the hydrocarbon is isopropylbenzene.

5. The process according to claim 2 wherein the hydrocarbon is n-butylbenzene.

6. The process for oxidizing toluene to form benzoic acid which comprises contacting said hydrocarbon and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at an elevated temperature of at least 350° C.

7. The process for oxidizing toluene to form benzoic acid which comprises contacting toluene and sulfur dioxide, as the sole source of oxygen for the reaction, with vanadium oxide as a catalyst for the reaction at atmospheric pressure and a temperature within the range of 350 to 450° C. and a contact time of reactants and catalyst of 3 to 5 seconds.

8. The process for oxidizing toluene to form benzoic acid which comprises contacting toluene and sulfur dioxide, as the sole source of oxygen for the reaction, with tungsten oxide as a catalyst for the reaction at atmospheric pressure and a temperature within the range of 350 to 450° C. and a contact time of reactants and catalyst of 3 to 5 seconds.

References Cited in the file of this patent

UNITED STATES PATENTS

| | | |
|---|---|---|
| 1,284,887 | Gibbs | Nov. 12, 1918 |
| 2,662,923 | Reeder | Dec. 15, 1953 |